United States Patent [19]

Tanuma

[11] 4,329,560
[45] May 11, 1982

[54] FLASH WELDING METHOD
[75] Inventor: Kinji Tanuma, Kawasaki, Japan
[73] Assignee: National Research Institute for Metals, Tokyo, Japan
[21] Appl. No.: 137,639
[22] Filed: Apr. 7, 1980
[30] Foreign Application Priority Data
  May 29, 1979 [JP] Japan ................... 54-65654
[51] Int. Cl.³ ............... B23K 11/04; B23K 11/24
[52] U.S. Cl. .................................. 219/100; 219/108
[58] Field of Search .................... 219/97, 100, 108

[56] References Cited
U.S. PATENT DOCUMENTS

| | | | |
|---|---|---|---|
| 2,727,969 | 12/1955 | Platte | 219/97 |
| 3,119,927 | 1/1964 | Neukom et al. | 219/97 |
| 3,484,578 | 12/1969 | Sciaky | 219/97 |
| 4,052,585 | 10/1977 | Sidyakin et al. | 219/100 |
| 4,273,984 | 6/1981 | Hara et al. | 219/97 |

FOREIGN PATENT DOCUMENTS 569416  8/1977  U.S.S.R. ................... 219/97

Primary Examiner—J. V. Truhe
Assistant Examiner—Keith E. George
Attorney, Agent, or Firm—Sherman & Shalloway

[57] ABSTRACT

In a method for flash welding metallic materials comprising a flashing step of applying a commercial alternating voltage or a direct-current voltage resulting from its full-wave rectification to the abutting ends of metal workpieces contacted partly with each other to generate Joule heat at their abutting ends and the vicinity thereof and then to generate sparks between the ends and repeating the procedure, and an upsetting step of press-bonding the ends and supplying an electric current to the metallic workpieces during this time; the improvement wherein the alternating voltage or direct-current voltage is used as a fundamental wave voltage and another voltage is superimposed thereon to modulate the wave form of the fundamental wave to obtain a distorted wave voltage, the distorted wave voltage being such that in each 360° cycle, the Joule heat generating period begins at a phase angle between −45° and 0° and terminates at a phase angle between 45° and 135° in the first half cycle and begins at a phase angle between 225° and 315° in the second half cycle.

11 Claims, 6 Drawing Figures

FLASH WELDING METHOD

This invention relates to an improvement in a flash welding method.

Flash welding comprises a flashing step of supplying an electric current to the ends of workpieces contacted partly with each other to generate Joule heat at their abutting end surfaces and the vicinity thereof by short-circuiting and then to generate sparks and repeating the aforesaid procedure, and an upsetting step of press-bonding these ends and supplying an electric current during this time. The current supplied in each of these steps is usually a commercial alternating current.

Since a commercial alternating voltage is of sine wave form and its momentary value varies periodically, an instance occurs periodically at which the alternating voltage becomes zero. In the flashing step of flash welding, Joule heat is generated by short-circuiting when the momentary value of voltage is rising, for example until the phase angle of each half cycle reaches about 30°. When the voltage further increases, sparks begin to occur.

Generally, in the flashing step, it is necessary that the abutting ends of workpieces should be uniformly heated to a sufficiently high temperature, the aforesaid abutting ends should be smooth, and that the space between the abutting ends should be maintained narrow. These requirements are inconsistent with each other, however.

For example, a large current is required for continuously generating sparks stably. If a secondary no-load voltage of a welding transformer is increased to obtain a large current, arc is prone to be generated between the abutting ends and the abutting ends lose smoothness. As a result, the quality of the weld is reduced. Furthermore, the spark generating period within a half cycle of an alternating current is prolonged and the Joule heat generating period is shortened. Consequently, the abutting ends of the workpieces and the vicinity thereof cannot attain a temperature sufficiently high for welding. Also, the use of a large current increases the electric capacity of the welding machine, and induces a flicker phenomenon in a distribution network. On the other hand, when the secondary no-load voltage is reduced, fusing of the abutting ends of workpieces becomes difficult, and the welding fails with the occurrence of a so-called freezing phenomenon.

It is an object of this invention therefore to provide a flash welding method which overcomes the difficulties of the conventional flash welding method, and can give excellent welds at low voltages.

The object of this invention is achieved, in a method for flash welding metallic materials comprising a flashing step of applying a commercial alternating voltage or a direct-current voltage resulting from its full-wave rectification to the abutting ends of metal workpieces contacted partly with each other to generate Joule heat at their abutting ends and the vicinity thereof and then generate sparks between said ends and repeating the aforesaid procedure, and an upsetting step of press-bonding said ends and supplying an electric current to the metallic workpieces during this time, by the improvement wherein said alternating voltage or direct-current voltage is used as a fundamental wave voltage and another voltage is superimposed thereon to distort the waveform of the fundamental wave, said distorted wave form being such that its phase angle between −45° or 0° and 45° or 135° in each half cycle are applied to the Joule heat generating period.

One novel aspect of this invention consists in using a voltage of a distorted waveform which permits a sufficiently long Joule heat generating period and gives a high voltage required for spark generation at a predetermined time, said distorted waveform being obtained by superimposing another voltage upon a commercial alternating voltage or a direct-current voltage resulting from its full-wave rectification.

According to this invention, the amount of heat which may be lost together with flash particles from the end portions of weld workpieces can be reduced, and the abutting ends of the workpieces and the vicinity thereof can be maintained at a high temperature. Hence, weld joints of high quality can be obtained.

The construction and advantages of this invention are described below in detail with reference to the acompanying drawings in which.

Figure 1:
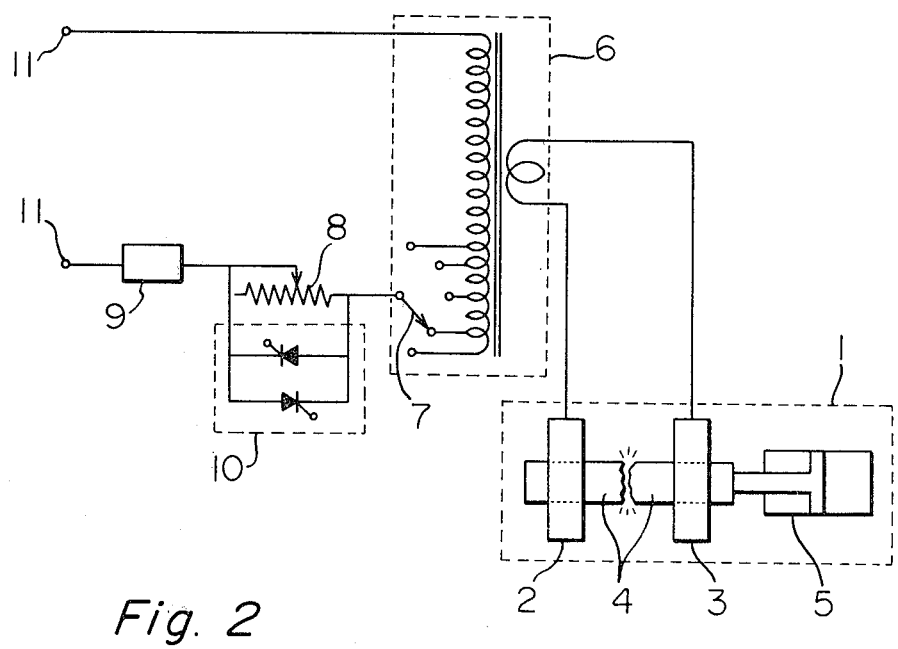
FIGS. 1 and 2 are views showing the method of generating a distorted waveform alternating voltage by using a single phase alternating current power source and sketches of welding machines.
Figure 3:
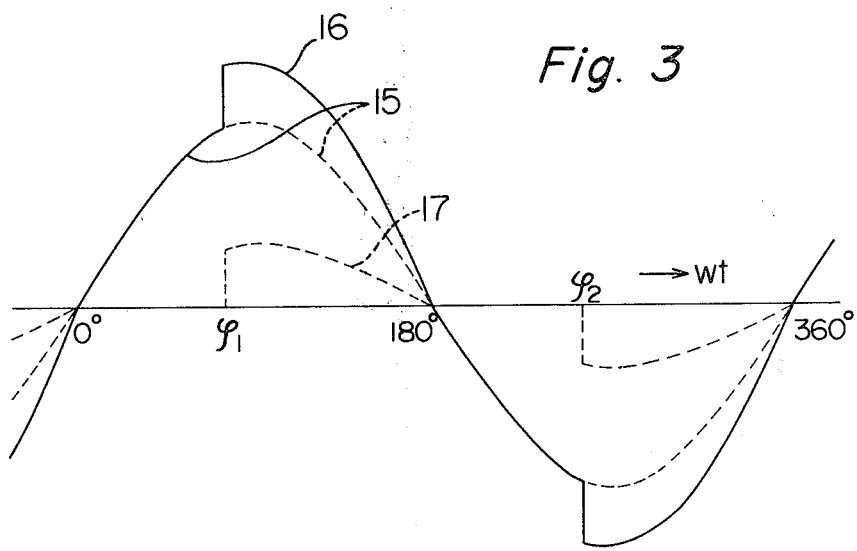
FIGS. 3 and 4 show waveforms of voltage obtained from a single phase alternating current power source, FIG. 3 showing a voltage waveform obtained when a switch of a mechanical system such as an electromagnetic system is used in a primary circuit of a welding transformer, and FIG. 4 showing a voltage waveform obtained when the aforesaid switch is of an electrical system such as a thyristor.
Figure 4:
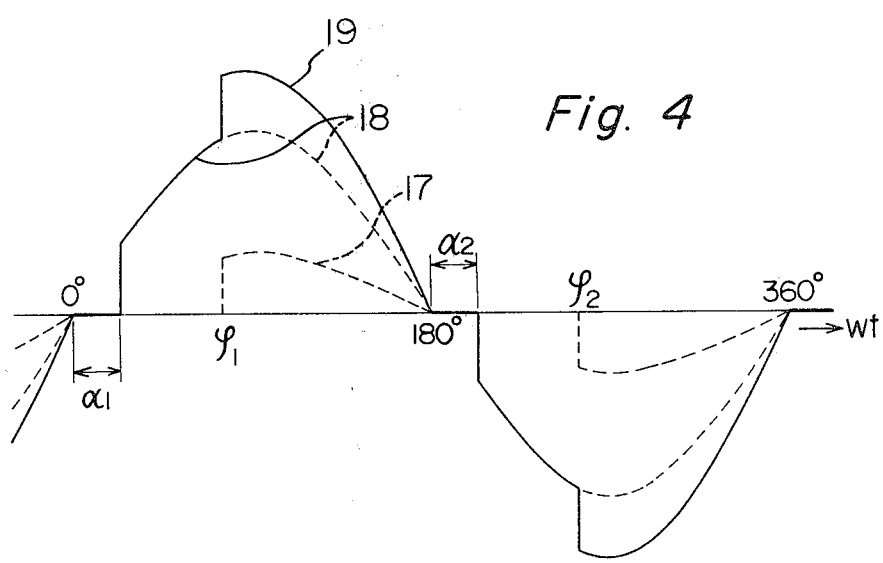

Referring to FIG. 1, workpieces 4 are secured to a fixed clamp 2 and a movable clamp 3 of a main body 1 of a welding machine, and can move with the movable clamp during welding by a pressure applicator 5. The two clamps 2 and 3 concurrently serve as electrodes, and are connected to a secondary winding of a welding transformer 6. An alternating voltage of sine wave having a commercial frequency is applied across terminals 11 to bring a thyristorstack 10 connected in inverse parallel relationship into the OFF state and close an electromagnetic switch 9. Thus, the voltage is applied to a primary winding of the welding transformer 6. This induces an alternating voltage 15 of sine wave, which is a fundamental wave alternating voltage in the secondary winding of the transformer as shown in FIG. 3. When a thyristorstack is used as the switch 9, the circuit is closed inevitably with a delay corresponding to a phase control angle $\alpha_1$ or $\alpha_2$, as shown in FIG. 4, and therefore a fundamental wave alternating voltage 18 which is zero during this period is induced. Then, by turning on the thyristorstack 10 at a phase control angle $\phi_1$ and $\phi_2$, there is no decrease in voltage due to a variable resistance 8 between a conductive angle of $(180° - \phi_1)$ and $(360° - \phi_2)$, and an alternating voltage of distorted waveform 16 or 19 shown by a solid line in FIG. 3 or 4 is obtained in the secondary winding of the welding transformer 6. Turning on of the thrystorstack 10 can be performed at a predetermined time by any desired known automatic control device.

Figure 2:
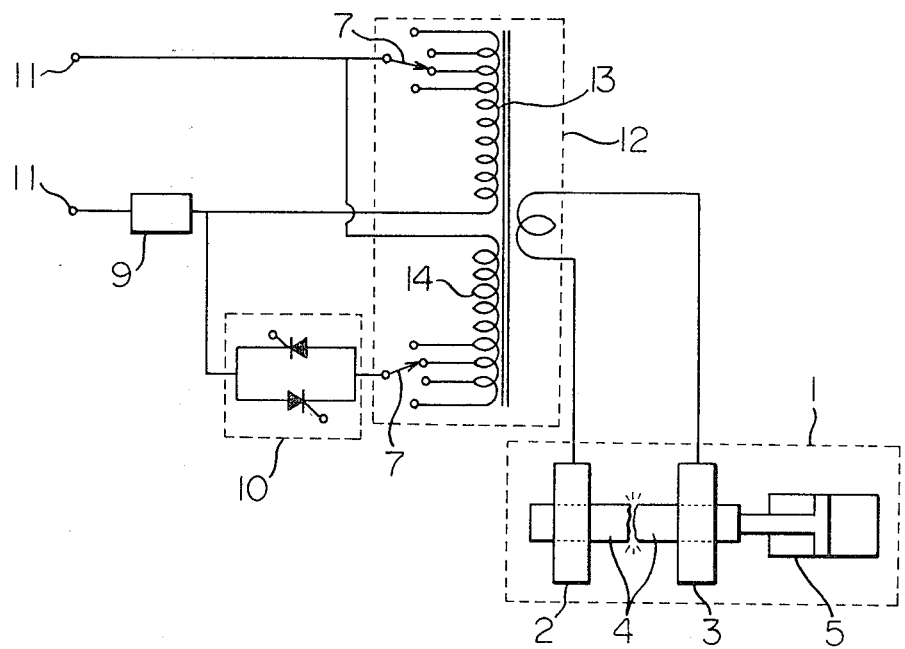

In FIG. 2, the main body 1 of welding machine and the connection between the main body 1 and the secondary winding of a welding transformer 12 are the same as in FIG. 1. The welding transformer 12 includes two sets of primary windings 13 and 14 for inducing a fundamental alternating voltage 15 or 18 and a phase-controlled pulse wave alternating voltage 17. By closing a magnetic switch 9 and turning on a thyristorstack 10 at a phase control angle of $\phi_1$ and $\phi_2$, there can be induced in the secondary winding of the welding transformer a distorted wave alternating voltage 16 shown by a solid line in FIG. 3 which results from the superimposition of the pulse wave alternating voltage 17 upon the fundamental wave alternating voltage 15 or 18. When a thyristor or ignitron is used as the switch 9, and alternating voltage of distorted wave 19 having a phase control angle $\alpha_1$ and $\alpha_2$ as shown in FIG. 4 can be obtained.

By applying such a distorted wave alternating voltage 16 or 19 to the abutting ends of workpieces 4, a short-circuit current is caused to flow through these abutting end portions during a period of from 0° to $\phi_1$ and 180° to $\phi_2$ in FIG. 3, and during a period from $\alpha_1$ to $\phi_1$, and $\alpha_2$ to $\phi_2$ in FIG. 4 to generate Joule heat in the aforesaid ends and the vicinity thereof. Then at $\phi_1$ and $\phi_2$ at which the applied voltage abruptly increases, the aforesaid ends are fused and scattered. By repeating such Joule heat generation and fusing for each half cycle, the end portions of the weld workpieces are heated uniformly to a high temperature. Thereafter, by rapidly applying pressure to the workpieces by a pressure applicator 5, the abutting ends are brought into intimate contact with each other to obtain a complete weld joint.

When a thyristor or ignitron is used as the switch 9 in FIGS. 1 and 2, it is impossible to avoid a period in which the voltage at a phase control angle $\alpha_1$ and $\alpha_2$ is zero as shown in FIG. 4. Since this period does not contribute to the heating of the ends of the workpieces, it is preferred to minimize $\alpha_1$ and $\alpha_2$. The phase control angles $\phi_1$ and $\phi_2$ for generating the pulse wave alternating voltage 17 should be sufficiently large to heat the ends of the workpieces with Joule heat by the fundamental wave alternating voltage 15 or 18. It has been found in accordance with this invention that these angles should be within the range of from 45° to 135°, and from 225° to 315°, respectively. In other words, the ends of the workpieces should not be fused at an angle smaller than $\phi_1$ and $\phi_2$ of the fundamental wave alternating voltage 15 or 18, but should be fused at these angles $\phi_1$ and $\phi_2$ or immediately after these angles are attained. These conditions can be determined by properly selecting a voltage change-over switch 7, a variable resistance 8, the phase control angles $\phi_1$ and $\phi_2$ of a thyristorstack 10, etc. The value of the pulse wave alternating voltage 17 should be of a sufficient magnitude as to enable the ends of workpieces to be fused by superimposition upon the fundamental wave alternating voltage 15 or 18. If it is excessively large, it will reduce the smoothness of the end portions of the workpieces and may cause defects to the weld part. Accordingly, the pulse wave alternating voltage 17 should be minimized within a range in which the ends of the workpieces can be fused and scattered.

Figure 5:
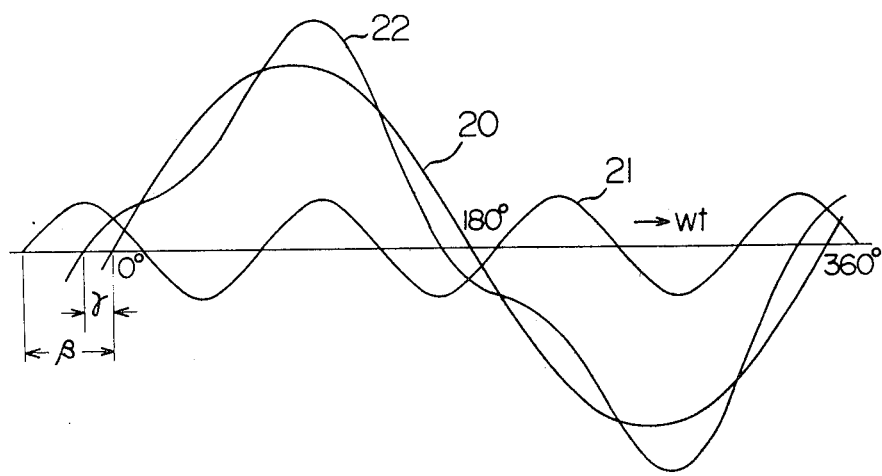
FIG. 5 shows a distorted waveform of alternating voltage obtained from two single phase alternating voltages of different frequencies.

A distorted wave alternating voltage similar to the distorted wave alternating voltage 16 or 19 in FIG. 3 or 4 can be generated by methods other than the methods shown in FIGS. 1 and 2. As shown in FIG. 5, a distorted wave alternating voltage 22 with a phase in advance of the fundamental alternating voltage 20 by $\epsilon$ can be obtained by superimposing a third harmonics voltage 21 of odd harmonics with a phase advanced by $\beta$ upon the fundamental wave alternating voltage 20 of commercial frequency. Although the initial stage of the half wave of the aforesaid distorted wave alternating voltage is of low voltage, the aforesaid voltage soon becomes high. Thus, this waveform is suitable for the object of this invention. The waveform of the distorted wave alternating voltage obtained by this method can be determined by the value of the fundamental wave alternating voltage 20, the value and frequency of the harmonics voltage, and the phase angle $\beta$ of the two voltages. The distorted wave alternating voltage 22 can also be generated by utilizing a phenomenon of magnetic hysteresis or magnetic saturation of a reactor (not shown) in a primary or secondary circuit of the welding transformer.

The degree of distortion of the distorted wave alternating current can be expressed by the crest factor which is the ratio of its maximum value to its root-mean-square value. A pure sine wave has a crest factor of 1.41, and a rectangular wave has a crest factor of 1.00. For example, if in FIG. 3, $\phi_1$ is supposed to be 90° a distorted wave alternating voltage obtained by superimposing a pulse wave alternating voltage 17 having a maximum value of 1 V upon a fundamental wave alternating voltage 15 having a maximum value of 4 V has a crest factor of 1.56. In the present invention, it is preferred to use a distorted wave alternating current having a crest factor of at least 1.50. A distorted wave alternating voltage having a crest factor of less than 1.50 can also be used in this invention, but it is difficult to select the value of the fundamental wave alternating voltage, the value of the pulse wave alternating voltage, and the phase control angles thereof.

When a three-phase alternating current power source of commercial frequency is utilized, one cycle 26 of commercial frequency can be converted to one cycle 27 of a lower frequency of superimposing three half waves in the same direction of a first phase 23, a seond phase 24 and a third phase 25 of a sine wave alternating voltage having phases different by 120°. A distorted wave alternating voltage 29 can be obtained by superimposing a voltage 28 upon the third phase 25 alone. The resulting distorted wave alternating voltage of low frequency is also suitable for the object of this invention.

Figure 6:
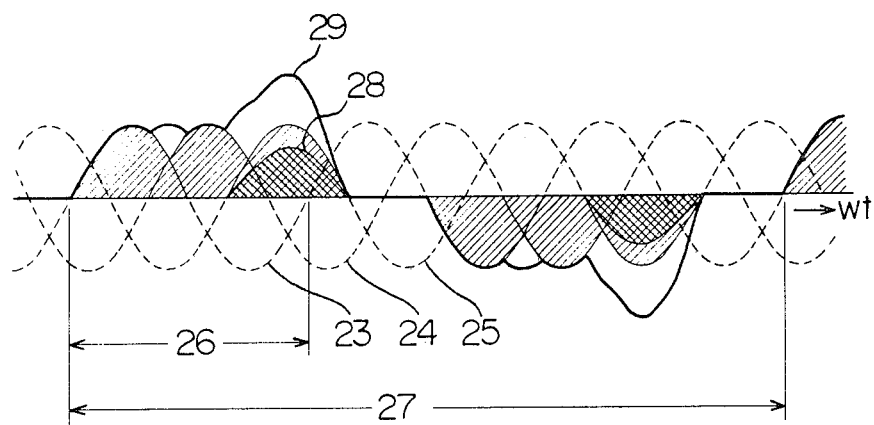
FIG. 6 shows a distorted waveform of alternating voltage of a low frequency obtained from a three phase alternating voltage.

An alternating voltage is thermally equivalent to a direct-current voltage resulting from the full-wave rectification of the aforesaid voltage. Accordingly, a distorted wave voltage of direct current which is thermally equivalent to the distorted wave alternating voltage can be obtained by inserting a rectifier element between the welding transformer 6 or 12 and the electrodes 2 and 3 and subjecting the voltage to full-wave rectification. Furthermore, a distorted wave voltage of direct current equivalent to the above can also be obtained by using electrically independent two or several welding transformers, subjecting the secondary voltages of these transformers to full-wave rectifications, and connecting the full-wave rectified voltages in parallel. These distorted wave direct-current voltages can be utilized for the achievement of the object of this invention in the same way as the distorted wave alternating voltage. In particular, when a distorted wave voltage of direct current or low frequency is used in welding workpieces of large sizes or magnetic materials, it gives the advantage that the reactance of the secondary circuit of the welding transformer can be made lower than in the case of using a distorted wave alternating voltage of commercial frequency. The use of a distorted wave alternating voltage having an excessively low frequency is likely to cause variations in welding effect. In flash welding, it is necessary to change quickly from the flashing step to the upsetting step. In steel welding, the time from the change-over to the upsetting step until the end of the upsetting step, i.e., the time required for performing the upsetting step, is desirably within 0.1 second. If the frequency of the distorted wave alternating voltage is excessively low, the momentary value of voltage may vary at the time of change-over to the upsetting step, and cause variations in the welding effect. From this viewpoint, the frequency of the distorted wave alternating voltage is preferably at least 5 Hz. As shown in FIG. 6, the frequency can be easily reduced to one-third thereof, and in the case of a commercial frequency of 60 Hz, it is convenient to use a frequency of 20 Hz.

According to the present invention, it is possible to prolong the period during which the ends of weld workpieces and the vicinity thereof are heated by the Joule heat in the flashing step, and to shorten the period during which molten metal particles scatter. Accordingly, the amount of heat lost from these end portions can be reduced, and the end portions can be fully heated. Consequently, the energy efficiency in the flashing step increases, and it is possible to reduce the upsetting current and the upsetting pressure and shorten the length of material lost in the upsetting step. Furthermore, the quality of the welded part is improved.

The following Examples illustrate the present invention specifically.

The workpieces, welding machines, welding conditions and testing method used in these Examples were as follows:

(1) Weld workpieces and their dimension and shape:
  Cold-rolled carbon steel sheets (JIS G 3141), thickness of 1.2 mm, width 63 mm
(2) Main body of a welding machine:
  The type shown at 1 in FIGS. 1 and 2
(3) Welding conditions:
  Initial extension: 7.5 mm + 7.5 mm
  Total flash-off: 2 mm + 2 mm
  Flashing time: 2 seconds
  Platen acceleration: 1 mm/sec$^2$
  Total upset: 0.4 mm + 0.5 mm
  Upsetting pressure: 6 Kgf/mm$^2$
  Upsetting current: 4500 A
  Upsetting current time: 0.1 second
(4) Method for testing a welded joint:
  Reverse bend twisting of butt welded joint (JIS Z 3126)

Example 1

This Example illustrates the case in which a single phase alternating current power source having a frequency of 50 Hz was used and the phase control angle $\alpha_1$ and $\alpha_2$ of the fundamental wave alternating voltage was zero.

The method of this invention was compared with a conventional method when the root-mean-square value of the secondary no-load voltage of the welding machine was in the range of 2.4 V to 5.6 V.

The resulting welded joint was evaluated by removing flashes formed on both surfaces of the weld part, cutting the weld with a width of 20 mm at right angles to the weld line, providing a bending tool having a radius of curvature of 10 mm on both sides of the resulting test piece, bending the test piece repeatedly about the weld part as a center, and measuring the bending cycles which were performed until breakage occurred.

TABLE 1

| Welding method | | Fundamental wave alternating voltage (volts) | | | |
|---|---|---|---|---|---|
| | | 2.4 | 3.2 | 4.0 | 5.6 |
| Method of this invention | Control angle 90°; pulse voltage 1 V | 60 | 48 | 34 | 8 |
| | Control angle 90°; pulse voltage 2 V | 58 | 51 | 32 | 8 |
| Conventional method | | * | * | 32 | 10 |

*Welding failed because of the occurence of a freezing phenomenon.

In the conventional method, flash did not occur at 2.4 V and 3.2 V, and welding was impossible. On the other hand, welding was possible at 4.0 V and 5.6 V, but the number of bendings of the weld joint until breakage was 32, and 10, respectively. The performance of the welded joint was low in view of the fact that the number of bendings of the original workpieces was 60.

In contrast, according to this invention, by superimposing a voltage having a root-mean-square value of 1 V or 2 V as a pulse wave alternating voltage having phase control angles $\phi_1$ of 90° and $\phi_2$ of 270° upon a fundamental wave alternating voltage, welding was possible even when the fundamental wave alternating voltage was 2.4 V. In addition, the number of bendings of the welded joint was 60 and 58, which was comparable to the original workpieces.

EXAMPLE 2

This Example illustrates the case wherein a single phase alternating power source having a frequency of 50 Hz was used and the phase control angle $\alpha_1$ and $\alpha_2$ of the fundamental wave alternating voltage were 15°.

The results of the repeated bending of the welded joint are shown in Table 2. A comparison of the results with those in Example 1 shows that if the phase control angle of the fundamental wave alternting voltage is about 15°, there is hardly any influence on the quality of the weld part.

TABLE 2

| Welding method | | Fundamental alternating voltage (V) | | | |
|---|---|---|---|---|---|
| | | 2.4 | 3.2 | 4.0 | 5.6 |
| Method of this invention | Control angle 90°; pulse voltage 1 V | 58 | 49 | 31 | 5 |
| | Control angle 90°; pulse voltage 2 V | 57 | 47 | 30 | 5 |
| Conventional method | | * | * | 31 | 6 |

*Welding failed because of the occurrence of a freezing phenomenon.

EXAMPLE 3

This illustrates the use of a three-phase alternating current power source.

The voltage used in welding and their waveforms were as follows (as shown in FIG. 6):
  Frequency of the fundamental alternating voltage: 16.7 (50×⅓) Hz
  Fundamental alternating voltage: 1.6 V for each phase
  Phase control angle ($\alpha$) of the fundamental wave alternating voltage: 15° for each phase Pulse wave alternating voltage: 0 V in the first and second phases, and 1.2 V in the third phase Phase control angle (α) of the pulse wave alternating voltage: 15°

The number of bendings that could be performed on the welded joint obtained by using the above voltage waveform was 53. When the pulse wave alternating voltage was superimposed, flash did not occur, and welding was impossible.

EXAMPLE 4

This Example illustrates the case wherein a direct current voltage obtained by full-wave rectification was used.

In the procedure of Example 1, the wave-form of the fundamental wave alternating voltage of 3.2 V was fully rectified, and used in the welding operation. The number of bendings that could be performed on the resulting welded joint was 52.

What we claim is:

1. In a method for flash welding metallic materials comprising a flashing step of applying a commercial alternating voltage or a direct-current voltage resulting from its full-wave recitification to the abutting ends of metal workpieces contacted partly with each other to generate Joule heat at their abutting ends and the vicinity thereof and then to generate sparks between said ends and repeating the aforesaid procedure, and an upsetting step of pressbonding said ends and supplying an electric current to the metallic workpieces during this time; the improvement comprising modulating said alternating voltage of direct-current voltage which is used as a fundamental wave voltage by superimposing thereon another voltage to obtain a distorted wave voltage having an increased peak value for generating sparks between the abutting ends, said distorted wave voltage being such that in each 360° cycle the Joule heat generating period begins at a phase angle between −45° and 0° and terminates at a phase angle between 45° and 135° in first half cycle and begins at a phase angle between 135° and 180° and terminates at a phase angle between 225° and 315° in second half cycle, with spark generation beginning at the end of each Joule heat generating period.

2. The method of claim 1 wherein a commercial alternating voltage is applied which is supplied from a single phase alternating current power source of commercial frequency.

3. The method of claim 1 wherein a commercial alternating voltage is applied and the frequency of said commercial alternating voltage is converted to a lower frequency of at least 5 Hz, and another voltage is superimposed on the alternating voltage of lowered frequency.

4. The method of claim 3 wherein a commercial sine wave alternating voltage having three phases is applied and is converted to a cycle having lower frequency by superimposing three half waves in the same direction of the first phase, the second phase and the third phase of said sine wave alternating voltage, each of the phases being 120° apart, the distorted wave voltage being obtained by superimposing a voltage upon said third phase.

5. The method of claim 1 wherein said distorted wave has a crest factor of at least 1.50.

6. The method of claim 1 wherein a distorted wave direct-current voltage is applied and is obtained by superimposing another voltage upon a direct-current voltage resulting from the full-wave rectification of a commercial alternating voltage.

7. The method of claim 1 wherein a distorted wave direct-current voltage is applied and is obtained by applying another voltage to a commercial alternating voltage, and then subjecting it to full-wave rectification.

8. The method of claim 1 wherein said voltage to be superimposed is a pulse voltage.

9. The method of claim 1 wherein said voltage to be superimposed is of alternating current.

10. The method of claim 1 wherein said voltage to be superimposed is a direct-current voltage resulting from the full-wave rectification of an alternating voltage.

11. The process of claim 1 wherein said distorted wave alternating voltage or the distorted wave direct-current voltage resulting from its full-wave rectification has a frequency lower than the commercial frequency but at least 5 Hz.

* * * * *

UNITED STATES PATENT AND TRADEMARK OFFICE
CERTIFICATE OF CORRECTION

PATENT NO. : 4,329,560
DATED : May 11, 1982
INVENTOR(S) : KINJI TANUMA

It is certified that error appears in the above—identified patent and that said Letters Patent is hereby corrected as shown below:

Claim 1, line 4, "recitification" should read --rectification--.

Claim 1, line 12, "of" should read --or--.

Signed and Sealed this

Thirty-first Day of August 1982

[SEAL]

Attest:

GERALD J. MOSSINGHOFF

Attesting Officer    Commissioner of Patents and Trademarks